June 6, 1961 E. K. DYSON 2,987,291
SHOCK MOUNT DEVICE
Filed July 23, 1958 2 Sheets-Sheet 1

INVENTOR.
Eugene K. Dyson
BY
Ezekiel Wolf, Wolf & Greenfield

United States Patent Office 2,987,291
Patented June 6, 1961

2,987,291
SHOCK MOUNT DEVICE
Eugene K. Dyson, 12 Mount Pleasant St., Winchester, Mass.
Filed July 23, 1958, Ser. No. 750,453
11 Claims. (Cl. 248—358)

The present invention relates to a mounting device adapted to insulate equipment from both vibration and shock.

The present invention is a mounting device particularly adapted for supporting heavy equipment in constructions which are subjected to both vibration and shock.

More particularly the present invention is designed for use in such places as, for example, vessels. A naval vessel is constantly vibrating as it moves through the water, usually at a reasonably low frequency. Occasionally it is subjected to substantial shocks usually generated by underwater explosions or gun blasts.

The present invention is designed to substantially isolate equipment from such vibrations and shocks.

Normally vibration is of a small magnitude and if the vibration characteristics of the mount are such that the excursion is not magnified to any substantial extent, no damage to the equipment will result. However, under vibration conditions where the motivating or exciting frequency of vibration equals the natural frequency of the equipment on its mount, excursion or amplitude of the vibration of the equipment would be magnified. This ordinarily results in substantial damage to the equipment or to the mount itself. In other words, if equipment is mounted upon a resilient mounting base adapted to withstand shocks with the spring rate (that is, force per unit measure of deflection) relatively low, vibrations of the vessel at a frequency equal to the natural frequency of the equipment on its mount will cause a vibration of the equipment at an ever increasing amplitude. While the utilization of a damping mechanism may be effective where equipment is subjected to forcing or exciting vibrations of the same frequency as the natural frequency of the equipment and mount; that is, where resonant conditions are set up, such equipment is cumbersome.

In overcoming this, applicant has devised a mount in which provisions are made to accommodate both the forces due to vibration and the forces due to shock. In the arrangement a mount is provided with a portion of the mount having a high spring rate adapted to effectively absorb vibrations, and another portion of the mount having a low spring rate adapted to effectively absorb forces of shock.

A further object of the present invention is to provide a shock mounting device adapted to effectively absorb vibrations of any frequency and relatively low amplitude in addition to vertical shock of any magnitude as well as horizontal shock of the same or a different magnitude.

A further object of the present invention is to provide a mounting device of simple construction which may be designed for equipment of substantially any individual size, in which the mounting device is adapted for ready installation.

These and other objects of the present invention will be more clearly understood when considered in conjunction with the accompanying drawings in which.

Figure 1:
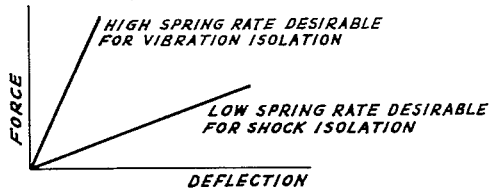
FIGURES 1, 2 and 3 are graphic representations of force-deflection curves used in explanation of the invention.

In designing a suitable mount for isolating both the forces of shock and vibration, it is necessary to keep the slope of the fore-deflection curve (or spring rate of the mount in pounds per inch), as illustrated in FIG. 1, reasonably low in order to provide the required shock isolation. Additionally, however, it is desirable to keep the slope of the force-deflection curve high in order to provide suitable vibration isolation. A low spring rate as required for shock isolation results in a very low natural frequency of the equipment and mount. Thus, when the supporting object vibrates at low frequencies as commonly occurs on shipboard, a resonant condition may quite probably result. This, as previously indicated, subjects the equipment to substantial damaging forces.

Figure 2:
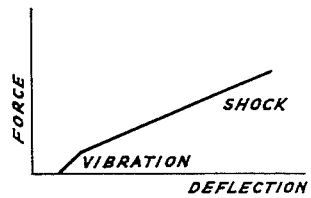

In previous attempts to overcome this problem, a compromise was effected which has not proved to be completely satisfactory. Here the equipment is mounted on a plate with the plate sandwiched between two resilient pads, as for example rubber, with the pads preloaded or compressed. This type of arrangement results in a force-deflection curve such as is illustrated in FIG. 2. This arrangement however is in effect a compromise of good shock isolation with poor vibration isolation, or conversely, good vibration isolation with poor shock isolation. In this arrangement the action of the preloaded rubber pads effects the portion of the curve indicated as "vibrations."

Figure 3:
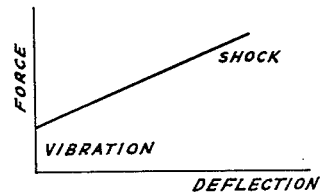

A most desirable force-deflection curve is illustrated in FIG. 3 where the vibration portion of the curve is as steep as possible and therefore in fact becomes infinitely steep, while at the same time the slope of the shock portion of the curve is very low. This arrangement of the shock portion of the curve would indicate the equipment is effectively isolated from damaging shocks. Ideally, of course, the effects of vibration can be minimized by securely bolting or otherwise securing the equipment to the supporting member. However, this does not take into account the necessity of isolating for shock.

Figure 4:
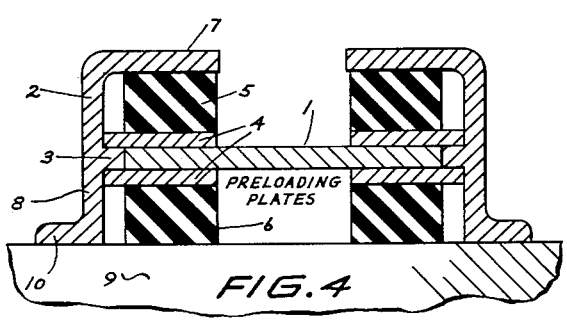
FIGURE 4 is an embodiment of the present invention.

Referring now to FIG. 4, there is shown one embodiment of the present invention. In this arrangement a support plate or member 1 to which the equipment is directly secured is positioned within the container 2. This container 2 which may be rectangular, square, or otherwise shaped, is for illustration, cylindrical in shape and is provided with an inwardly extending annular shoulder 3 which is normally aligned with the supporting member 1. Preferably the supporting member 1 is disk shaped. A pair of annular preloading plates 4 of steel or other rigid material is sandwiched about the member 1. The outer diameters of these preloading plates are greater than the inner diameters of the shoulder 3. These plates 4 are adapted to bear against the shoulder 3. Resilient annular members 5 and 6 are positioned respectively above and below the upper and lower preloading plates 4. These annular members 5 and 6 are formed of rubber or similar resilient material. The member 5 is secured under compression between the upper preloading plate 4 and the inwardly extending lip 7 of the casing 8, while the lower annular member 6 is positioned between the lower preloading plate 4 and the base 9 of the mounting plates. The base 9 may comprise a rigid body of any desirable proportion to which the casing 8 is rigidly secured by welding or any other suitable means, as for example along the peripheral outwardly extending flange 10. As the spring rate for shock isolation is a function of the spring rate and degree of compression of the members 5 and 6, the ability of the mounting device to absorb shock may be adjusted by varying the material, size and shape of the members 5 and 6. By way of further explanation the top preloading plate 4 prevents the top annular pressure member 5 from following any downward deflection of the bottom compression member 6, thus eliminating substantially the amplification effect of the forces of vibration in the operation of this device. Simultaneously a low spring rate is provided by virtue of the resilient annular members 5 and 6 for the purpose of isolating forces of shock.

While the modification of FIGURE 4 is illustrated as cylindrical in shape utilizing annular preloading plates, it should be understood that the construction may be rectangular or otherwise shaped without departing from the fundamental concept.

Figure 5:
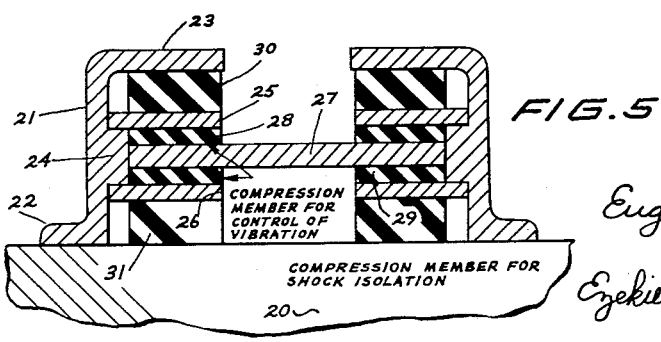
FIGURE 5 is another embodiment of the present invention.

A further modification of this invention is illustrated in FIGURE 5 in which a non-yieldable base 20 has secured to it by welding or other suitable means a casing 21 which may be secured, as for example, along the annular flange 22. The upper end of the casing 21, which may if desired assume a substantially cylindrical shape, terminates in an inwardly extending flange 23. Within the casing 21 on the inner walls thereof, there is formed an annular shoulder 24, preferably symmetrically located with respect to the height of the interior of the casing. Normally bearing against the upper and lower surfaces respectively of the shoulder 24 are the preloading plates 25 and 26, respectively. A disk 27 of rigid material, such as steel, adapted to have secured to it the equipment, is positioned within the casing 21. This member 27 has a width which is narrower than the width of the shoulder 24 and is normally positioned in a plane horizontally symmetrical with respect to the plane of the shoulder 24. Positioned between the member 27 and the upper and lower preloading plates 25 and 26 are annular compression members 28 and 29, respectively, with each formed of a resilient material such as rubber. These compression members are preloaded and are maintained under compression by annular elements 30 and 31 positioned respectively between the preloading plate 25 and flange 23 and between the preloading plate 26 and the base 20. These elements 30 and 31 are compressed and maintained under greater force than the force of compression of the members 28 and 29 whereby the plates 25 and 26 are normally maintained in a position in which they bear against the shoulder 24. The compression members 28 and 29 may be formed of material and preloaded in such a manner as to provide any desired slope or spring rate to the vibration portion of the curve. In this way any combination of conditions of vibration or shock may be properly accommodated.

The amount of preloading of the elements 28 and 29 should exceed or at least equal the maximum forces which are to be transmitted to the equipment during normal vibration. This will assure the non-magnification of all vibration. Further, since the slope or spring rate, as illustrated for example by the curve of FIG. 3 in the area marked "vibration," determines the natural frequency of the equipment for vibration, it is possible to design the equipment so that its natural frequency can be maintained higher than any normally expected exciting or forcing vibration frequency which may be introduced by the ship's own engine or by other similar equipment. Simultaneously, the slope or spring rate of the shock portion of the curve may be maintained at a relatively low value to protect the equipment from violent shocks. The only limitation on the spring rate will then be the clearance between this particular piece of equipment and other equipment or bulkheads which might limit the amount of deflection of the equipment under shock conditions.

Figure 7:
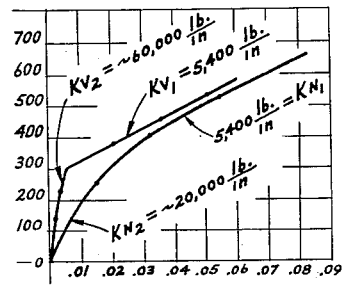
FIGURE 7 is a force-deflection diagram indicating typical results of the invention.

In FIG. 7 there is shown a force-deflection diagram which indicates the actual results obtained by a test of a shock mount developed for naval equipment using the principles herein disclosed. From this data, it is seen that the ratio of the spring rate for vibration and shock is 60,000:5,400 or approximately 11:1. The 60,000 pound per inch figure actually contains a factor caused by deflection in the metallic portions of the mount. The load bearing members and preloading plates in this test assembly were constructed of aluminum which deflects readily under force. If these parts were to be made sufficiently stiff by the addition of ribs, and possibly by a change of material, the slope of the vibration portion of the curve would approach infinity; that is, the 60,000 pound per inch spring rate would be considerably larger and that portion of the curve would approach the vertical.

Figure 6:
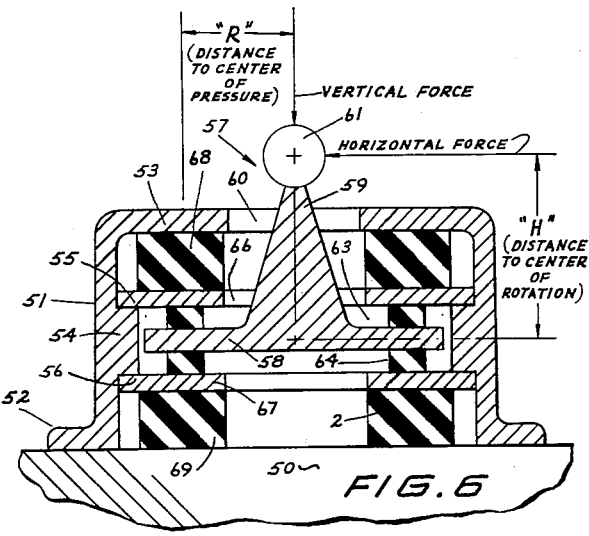
FIGURE 6 is a preferred embodiment of the present invention.

A more specific and preferred embodiment of the invention is illustrated in FIG. 6. This particular construction is designed to handle both vertical and horizontal loading. In this arrangement, the rigid non-yielding base 50 has secured to it by suitable means a casing 51 which may be cylindrical in shape, providing an outwardly extending flange 52 at its lower end which may be welded or bolted to the base 50. An inwardly extending flange 53 is secured to the upper edge of the casing. Within the casing there is formed an annular shoulder 54. Spaced from either end of the interior of the casing and providing upper and lower surfaces 55 and 56, respectively, an equipment supporting member, generally indicated at 57, is formed with its lower end positioned within the casing. This lower end comprises a disk shaped member 58 having a diameter preferably just a little shorter than the diameter of the interior of the casing at the shoulder 54. This disk shaped member 58 is normally positioned in a plane bisecting the plane of the shoulder 54. Axial with the disk shaped member 58 and integral with it is an elongated extension, preferably conic or pyramidic in shape, as indicated at 59. This elongated shape 59 extends upwardly through an opening 60 formed by the flange 53 and terminates at preferably a spherical bearing member 61. A pair of annular vibration isolating members 63 and 64 formed of a yieldable resilient material such as rubber are positioned above and below a disk-like member 58. It will be noted that the disk-like member 58 is not as thick as shoulder 54 and consequently its surfaces are spaced inwardly from the surfaces 55 and 56. Bearing against these surfaces 55 and 56 are the pair of preloading plates 66 and 67 which are made of a non-resilient rigid material such as steel or the like. The vibration isolating members 63 and 64 are maintained under compression between these preloading plates 66 and 67, respectively, and the surface of the disk-like member 58. On the outer sides of the preloading plates 66 and 67 are positioned the shock isolating members 68 and 69, respectively. These members are formed of a resilient yieldable material such as rubber and are also maintained under compression with the isolating member 68 compressed between the flange 53 and plate 66 and the isolating member 69 between the base 50 and the plate 67. The force which the compression shock isolating members 68 and 69 exert on the plates 66 and 67, respectively, should exceed that of the vibration isolating members 63 and 64. In this manner the preloading plates 66 and 67 will always normally bear against the shoulder 54.

With respect to the isolating members 63 and 64, the density of the material and the size and shape of the annular ring may be varied as well as the amount of compression in order to adjust for any desired condition of vibration. The members 68 and 69 may be similarly varied in order to adjust for any desired condition of shock, provided, however, as indicated above, the force exerted by these members 68 and 69 exceeds the force exerted by the members 63 and 64. The spring rate of the shock isolating members 68 and 69 should, however, be less than the spring rate of the vibration isolating members 63 and 64.

This particular cylindrical design provides an arrangement in which the mount will have substantially the same force-deflection curve and, consequently, the same shock isolation under forces from either the vertical or horizontal direction, or any combination of the two. The metal parts of the mount are arranged in such a manner that the equipment will be limited in movement even though the rubber parts should fail.

It is also possible in using this particular modification to obtain an adjusted force-deflection curve adapted to yield any desired ratio of vertical to horizontal shock. Referring to FIG. 6, if the dimensions marked H and R are equal, then the curve for vertical and horizontal shock should be the same. If H is made larger than R the mount will be softer for horizontal shock and if H is smaller the mount will be stiffer for horizontal shock. Thus, by varying these dimensions H and R while maintaining other parameters the same, a selected ratio of vertical to horizontal shock may be obtained.

In actual construction of these mounts, the casing may be made in several sections to permit insertion of, for example in FIG. 4, plate 4 between flange 3 and lip 7, with the separate portions secured together by bolting or other suitable means.

In one specific example of this invention made substantially in accordance with FIG. 4, the type of rubber used was 60 durometer rubber. It was preloaded to approximately 300 pounds. The rigid portions of the mount were made of aluminum.

The load supported was 100 pounds. The rubber elements had an inner diameter of 5 inches, an outer diameter of 7 inches and thickness of 1 inch which was precompressed to .94 inch. The spring rate of the element was 5,400 pounds per inch throughout a substantial portion of its travel.

Figure 8:
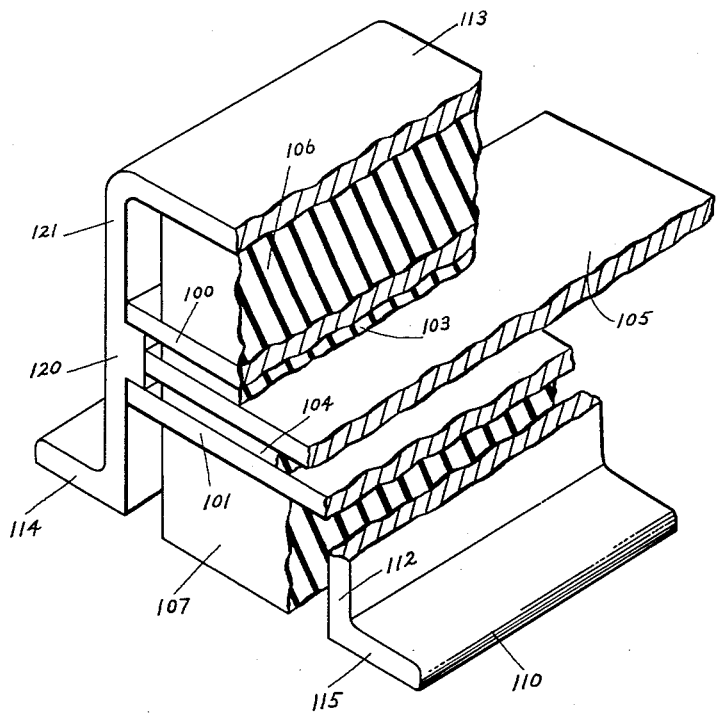
FIGURE 8 is a perspective fragmentary view of a modification of the invention.

A further modification of the invention is illustrated in FIG. 8. Here the preloading plates 100 and 101 are rectangular in shape and are positioned on either side of the rectangular compression members 103 and 104. These in turn bear against the horizontal projecting member 105 on which is at least partially supported the equipment being mounted. The compression members 106 and 107 are positioned respectively on the outer surfaces of the preloading plates 100 and 101.

The casing 110 comprising the sidewalls 121 and 112 connected by the bight section 113 is provided with outwardly extending flanges 114 and 115 adapted to be secured to a surface. The members 106 and 107 are adapted to bear under precompression against section 113 and the surface respectively. The plates 100 and 101 are adapted to bear against the upper and lower surfaces of the projection 120 as in the previous modification. If desired, one end of the unit may be closed to limit longitudinal movements of the sandwiched elements.

While reference is made to isolation of vibrations of any frequencies, it should be understood that certain supersonic frequencies would disintegrate the resilient portions of the mount. But as these frequencies are not ordinarily encountered in the present uses for which the present invention is intended, they may be disregarded for most intents and purposes.

Having described my invention, I claim:

1. A mount for supporting equipment on surfaces subjected to vibrations of relatively low amplitude and shock of substantially greater amplitude comprising a member adapted to be secured to said surface including a flange-like portion, a pair of preloading plates each formed of slightly yielding material abutting one on either side of said flange-like portion and adapted to be moved in a direction normal to and away from the plane of said flange-like portion resilient means urging each plate toward said other plate, a substantially rigid supporting plate between said preloading plates, and means for transmitting forces from said supporting plate to said first-mentioned plates.

2. A mount for supporting equipment on surfaces subjected to vibrations of relatively low amplitude and shock of substantially greater amplitude comprising a member to which said equipment may be rigidly secured, a pair of preloading plates normally abutting and engaging said member on opposite sides thereof with the plates formed of slightly yieldable material, and means having a lower spring rate than said plates pressing said plates toward said member, and means for maintaining a predetermined minimum spacing between portions of said plates.

3. A mount for supporting equipment on surfaces subjected to vibrations of relatively low amplitude and shock of substantially greater amplitude comprising a member to which said equipment may be rigidly secured, a pair of preloading plates each formed of slightly yielding material normally abutting one on either side of said member and each adapted to be displaced under force, a yieldable resilient element under compression and having a spring rate lower than said plates positioned one abutting the outer side of each plate, securing means for said elements whereby they exert pressure to urge said plates toward said member, and means for maintaining a predetermined minimum spacing between portions of said plates.

4. A mount for supporting equipment on surfaces subjected to vibrations of relatively low amplitude and shock of substantially greater amplitude comprising a member to which said equipment may be rigidly secured, a pair of preloading plates each formed of slightly yielding material normally abutting and at spaced positions one on either side of said member and each adapted to be displaced under force, a yieldable resilient element under compression and having a spring rate lower than said plates positioned one abutting the outer side of each plate, a casing at least partially surrounding said member, said plates, and said elements, said casing having inwardly extending end portions integral therewith against which the outer surfaces of said elements bear whereby pressure is exerted through said elements against said plates, and means maintained in fixed relationship to said surface for preventing movement of each plate inwardly from said normal abutting position toward the other plate.

5. A means for supporting equipment on surfaces subjected to vibrations of relatively low amplitude and shock of substantially greater amplitude comprising a casing having at least partially enclosing sidewalls and base and partially enclosing top, a rigid member to which said equipment may be rigidly secured positioned within and normal to the sidewalls, a pair of preloading annular plates each formed of slightly yielding material abutting one on either side of said member and each adapted to be moved under force, a pair of yieldable annular elements under compression and having a spring rate lower than said plates positioned one abutting the outer side of each plate, said elements maintained under compression by engagement between respectively said top and a plate and said bottom and a plate, and means maintained in fixed relationship to said surface for preventing movement of each plate inwardly from said normal abutting position toward the other plate.

6. A mount for supporting equipment on surfaces subjected to vibrations of relatively low amplitude and shock of substantially greater amplitude comprising a casing having enclosing sidewalls and base and partially enclosing top, an annular flange formed on the inner walls of said casing in a plane normal to its height, a member to which said equipment may be rigidly secured positioned within and normal to the sidewalls in a plane coincident with the plane of said flange, a pair of preloading plates each formed of slightly yielding material abutting one on either side of said member and each adapted to be moved under force, said plates also normally abutting and one on either side of said flange, and a pair of yieldable annular elements under compression and having a spring rate lower than said plates positioned one abutting the outer side of each plate, said elements maintained under compression by engagement between respectively said top and a plate and said bottom and a plate.

7. A device as set forth in claim 6, wherein said member comprises a disk having a projection extending normally therefrom toward said top to which said equipment is adapted to be secured.

8. A mount for supporting equipment on surfaces subjected to vibrations of relatively low amplitude and shock of substantially greater amplitude comprising a casing having enclosing sidewalls and base and partially enclosing top, an annular flange formed on the inner walls of said casing in a plane normal to its height, a member to which said equipment may be rigidly secured positioned within and normal to the sidewalls in a plane coincident with the plane of said flange, said member having a thickness less than said flange, a pair of preloading plates of slightly yielding material normally abutting respectively the upper and lower portions of said flange, a pair of annular vibration elements of yieldable resilient material under compression positioned between said plates and member whereby the compression is maintained, said plates adapted to be moved outwardly from said normal abutting position, a pair of yieldable annular elements under compression and having a spring rate lower than said plates and vibration elements in combination one abutting the outer side of each plate, said last mentioned elements maintained under compression by engagement between respectively said top and a plate and said bottom and a plate.

9. A shock mounting device comprising, a supporting base, an equipment supporting element having a normal position with respect to said supporting base, first and second means for transmitting opposed restoring forces from said supporting base to said supporting element to urge the latter toward said normal position, said first and second means having a first spring rate determinative of the rate at which said supporting element is restored to said normal position for small displacements therefrom, and third and fourth means for transmitting opposed restoring forces from said supporting base to said supporting element to urge the latter toward said normal position, said third and fourth means having a second spring rate determinative of the rate at which said supporting element is restored to said normal position when the displacement therefrom is greater than the magnitude of said small displacements, said first spring rate being greater than said second spring rate.

10. A shock mounting device in accordance with claim 9 wherein said third and fourth means transmit said restoring forces through said first and second means respectively and normally urge said first and second means toward said supporting element.

11. A shock mounting device comprising, a supporting base, an equipment supporting plate having a normal position in a plane passing through ridges extending from said supporting base spaced from said plate on opposite edges thereof, slightly yielding plates on opposite sides of said plate separated by and in contact with opposite faces of each of said ridges, and flexible means between said supporting base and each slightly yielding plate urging each plate toward said supporting plate whereby the spring constant of one of said rigid plates determines the rate at which said supporting plate is restored toward said normal position for small displacements therefrom and the spring constant of said flexible means determines said rate when the displacement of said supporting plate from said normal position exceeds the magnitude of said small displacements.

References Cited in the file of this patent

UNITED STATES PATENTS

| | | |
|---|---|---|
| 1,823,429 | Jansson | Sept. 15, 1931 |
| 2,678,796 | Roy | May 18, 1954 |